H. R. STRATFORD.
APPARATUS FOR AND METHOD OF MAKING RUBBER TUBES.
APPLICATION FILED FEB. 28, 1920.
1,358,124.  Patented Nov. 9, 1920.
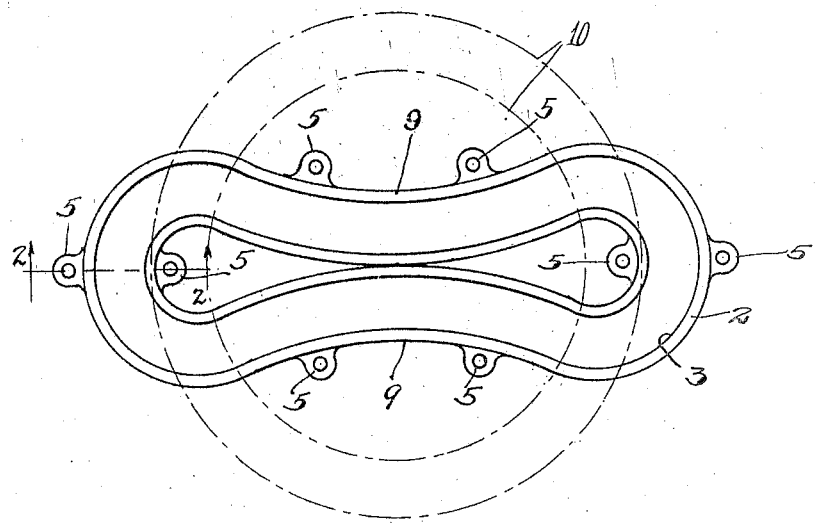
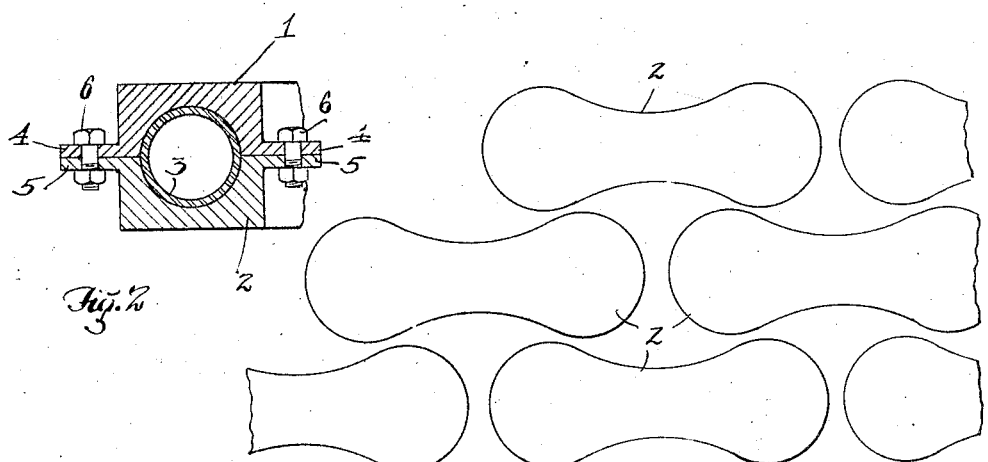
Inventor
Herbert R. Stratford
By Fay, Oberlin & Fay
Attorneys

UNITED STATES PATENT OFFICE.

HERBERT R. STRATFORD, OF CLEVELAND, OHIO.

APPARATUS FOR AND METHOD OF MAKING RUBBER TUBES.

1,358,124.  Specification of Letters Patent.  Patented Nov. 9, 1920.

Application filed February 28, 1920. Serial No. 362,048.

*To all whom it may concern:*

Be it known that I, HERBERT R. STRATFORD, a citizen of the United States, and a resident of Cleveland, county of Cuyahoga, and State of Ohio, have invented a new and useful Improvement in Apparatus for and Methods of Making Rubber Tubes, of which the following is a specification, the principle of the invention being herein explained and the best mode in which I have contemplated applying that principle, so as to distinguish it from other inventions.

The present invention relates to a method of making rubber tubes for use as the inner tubes for pneumatic tires. One object of the invention is to provide a tube which may be originally cured or vulcanized in such a form that when used as an annular tube its walls will be properly proportioned so that the inner wall will not buckle or wrinkle in the tire. A further object of the invention is to provide a method of making such tubes which will permit of their being vulcanized economically. To the accomplishment of the foregoing and related ends, said invention, then, consists of the means hereinafter fully described and particularly pointed out in the claims.

The annexed drawing and the following description set forth in detail certain means and one method of carrying out the invention, such disclosed means and mode illustrating, however, but one of various ways in which the principle of the invention may be used.

Figure 1 is a plan view of a mold designed to permit of the carrying on of my improved method; Fig. 2 is a cross section of the same on the line 2—2, Fig. 1; and Fig. 3 is a diagrammatic view illustrating the way in which molds of the shape shown in Fig. 1 can be packed together in a vulcanizing chamber.

In Figs. 1 and 2 I have shown a mold consisting of upper and lower halves 1 and 2, respectively, each of which is provided with a semi-circular tube-receiving recess. The entire tube is of course received in the joint recesses in the two mold parts 1 and 2, which are then clamped together by means of suitable lugs 4 and 5 and bolts 6, after which the mold is placed in the vulcanizing chamber and the tube is heated until vulcanization has been effected.

I intend to form a tube of raw rubber by means of the usual tubing machine which produces a straight tube. The two ends of such a tube will then be inserted one within the other to form the joint and this tube of raw rubber will then be laid in the lower mold 1. The shape of this mold is roughly a figure 8, and is designed in such a way as to produce a central inward curve or bulge 9, which will have a somewhat greater length from end to end of the mold than would a circular mold, which is indicated in dotted lines at 10. Even though it is not possible to give this figure 8-shaped mold exactly the same proportions on its inner and outer lines as a circular mold would have, it can be made to produce almost the same lines and distances, and thus after the tube has been vulcanized it can be sprung into a round condition which it will maintain. The raw rubber tube, when vulcanized in this type of mold, can be made to assume substantially a true annular form by vulcanization, and the inner and outer circumferences will be such that no wrinkling or buckling will occur, as is the case where the tube is cured when straight.

These figure 8-shaped molds may be closely packed together, as indicated in Fig. 3, and a very great economy in the vulcanizing can thus be effected, as a much larger number of molds can be accommodated at one time than is possible where the molds are annular and can not be so packed.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. A method of making rubber tubes which consists in curing an endless hollow tube while maintaining all parts of the same in a curved but non-annular condition.

2. A method of making rubber tubes, which consists in forming an endless tube into a non-annular but curved shape having inner and outer circumferences approximating those of an annular tube of the same size, and curing such tube in such shape.

3. A mold for curing rubber tubes comprising a chamber in the form of a figure 8.

4. A mold for curing rubber tubes comprising a chamber formed roughly as a figure 8, substantially as described.

5. A mold for curing rubber tubes comprising a tube-receiving chamber of non-annular shape, such chamber having outer and inner surfaces approximating in length the outer and inner circumferences of the tube adapted to be received in such chamber.

Signed by me, this 24th day of February, 1920.

HERBERT R. STRATFORD.